Jan. 24, 1956 H. A. GURNEY ET AL 2,732,128
CALCULATING DEVICE
Filed April 14, 1954 2 Sheets-Sheet 1
Fig. 1
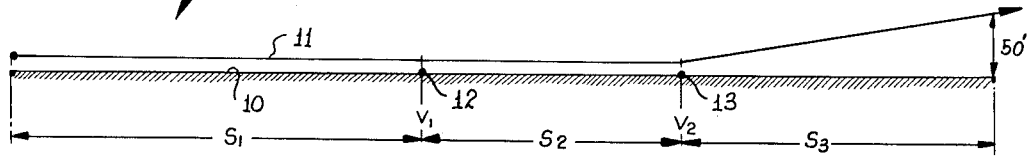
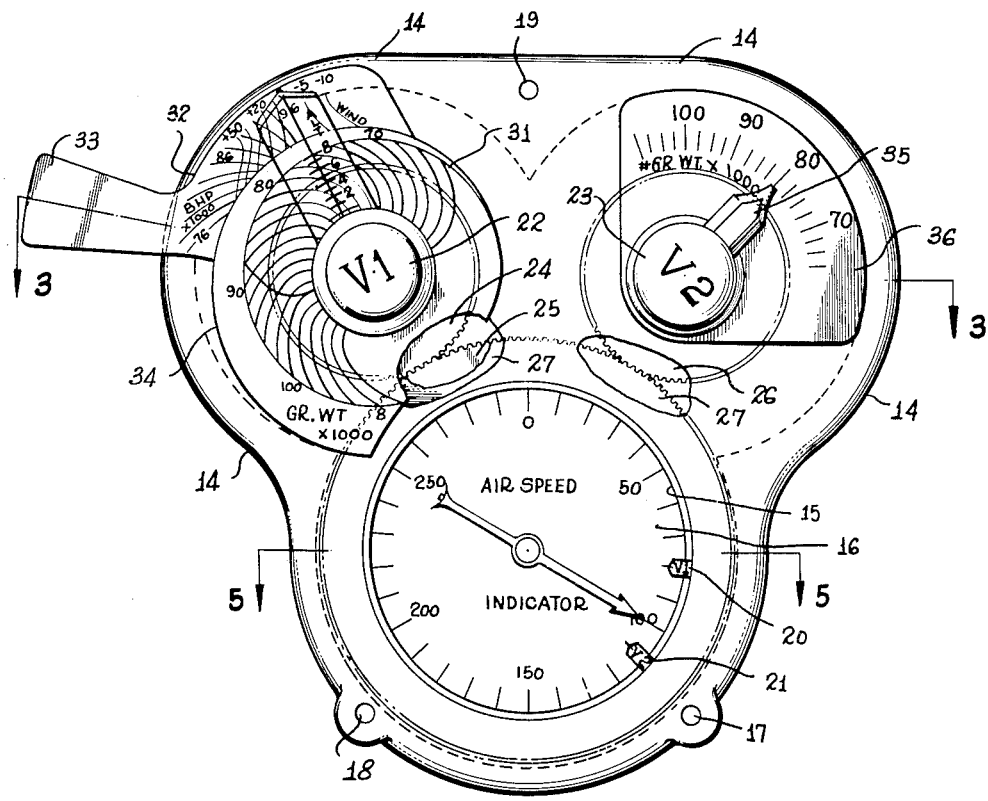
Fig. 2
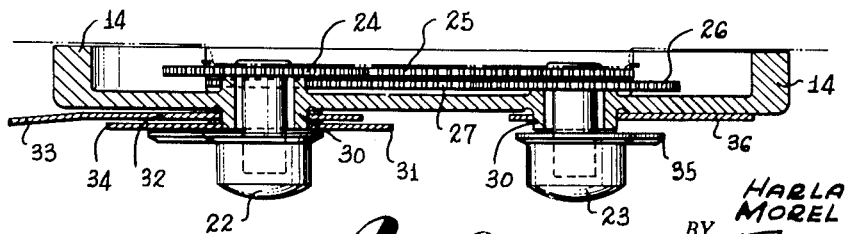
Fig. 3
INVENTORS
HARLAN A. GURNEY
MOREL D. GUYOT
BY
Attorney

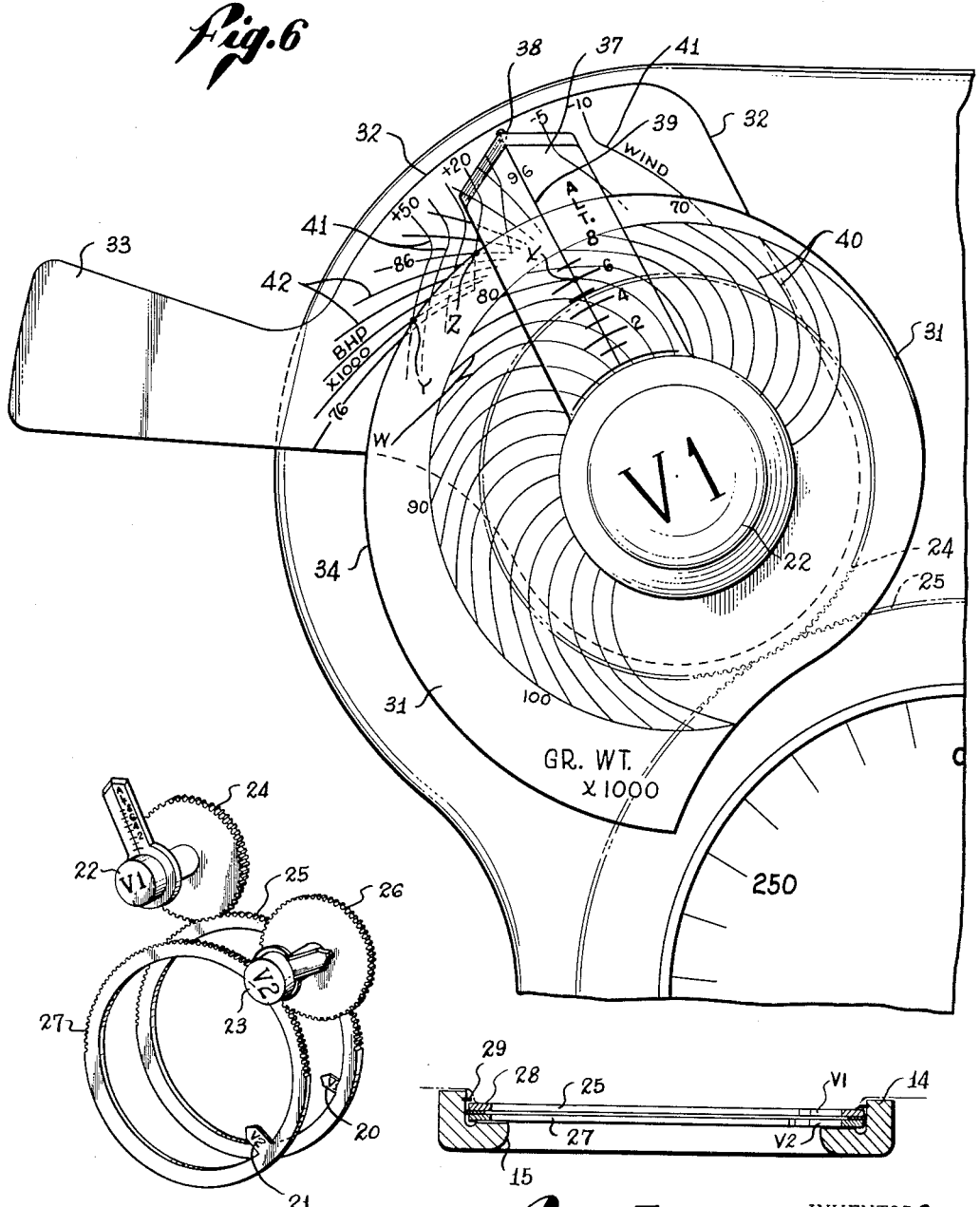

United States Patent Office 2,732,128
Patented Jan. 24, 1956

2,732,128

CALCULATING DEVICE

Harlan A. Gurney, Woodland Hills, and Morel D. Guyot, North Hollywood, Calif.

Application April 14, 1954, Serial No. 423,132

9 Claims. (Cl. 235—61)

This invention relates broadly to calculators for determining a quantity that is a function of several interdependent variables.

A preferred form of the invention has to do with the computation of certain quantities useful in the safe operation of multi-engine aircraft, and the present specification will be addressed to a description of the invention in this connection. It is to be understood, of course, that certain of the inherent principles of operation of the device will have application to other fields.

Before describing the preferred form of the invention, certain background information with regard to aircraft problems which the calculator is designed to solve will be set forth.

One of the most hazardous periods of aircraft operation is during the take-off. If the aircraft engine should fail at this time, the possibilities of recovery depend almost wholly on the skill and judgment of the pilot.

In the case of a multi-engine aircraft taking off from a runway of a given length, failure of one of the engines does not necessarily mean that the pilot must attempt to brake the plane to a safe stop rather than continue his take-off. Most present day multi-engine aircraft are capable of flying notwithstanding the failure of one of the engines. It will be evident, however, that during a take-off operation, the time at which one of the engines fails is critical in determining the safest procedure to be subsequently followed.

For example, if one of the engines should fail before the plane has attained a certain critical airspeed, it is entirely possible for the pilot to cut his other engines and brake the plane to a safe stop within the remaining length of the runway. On the other hand, if one of the engines should fail at a time when the plane has attained a speed above a certain critical airspeed, it may be far wiser for the pilot to continue his take-off notwithstanding the failure of one engine, and avoid any attempt to decelerate the plane to a stop, short of the end of the runway.

There is thus a critical air speed below which the pilot may safely decelerate his aircraft to a safe stop within the confines of the runway should an engine fail, and above which the pilot should not attempt to so decelerate the plane, but rather should continue his take-off. This critical air speed, for purposes of the present specification, is defined as the V1 critical speed. In other words, the V1 speed is that critical speed as indicated by the air speed instrument in the airplane at the time of an engine failure, at or below which the aircraft can be safely decelerated to a stop within the confines of the runway and at or above which the aircraft can be safely taken off within the confines of such runway.

During a take-off operation there is another critical speed known as V2. The V2 critical speed is defined as an indicated air speed which is 115% of the aircraft stalling speed at any given gross weight. It is deemed essential that this V2 speed be attained before the aircraft can be safely lifted from the runway. Further, it is deemed absolutely necessary for a safe, climb-out that the aircraft speed be maintained at a speed equal to or greater than this V2 speed. In the case of an engine failure, the V2 speed is important to the pilot in that it will advise him when it is safe to lift the plane from the runway. It is thus important that a pilot know both the V1 and V2 speeds in order to know the appropriate action to take in the event an engine failure occurs without warning.

The value of the critical V1 speed or speed below which an aircraft can be safely decelerated within the remaining runway length and above which the aircraft can safely continue its take-off, clearly will depend, among other factors, on the length and slope of the runway. Also, this speed will depend on the height of any obstructions at the end of the runway inasmuch as such obstructions would limit the useful length of the runway for a safe take-off. These factors are peculiar to each airport runway. In accordance with CAA regulations, data is made available indicating maximum permissible gross weights for any specific aircraft operating on any particular runway. In other words, if the aircraft is kept at or under such maximum gross weight as determined by the CAA regulations in view of the nature of the runway, there exists a critical V1 speed at which either a safe deceleration or a safe take-off may be accomplished on said runway notwithstanding failure of one engine.

Assuming that the aircraft gross weight is below the maximum permissible, the particular value of the V1 critical speed for the particular aircraft concerned will then depend on the following variable factors:

(1) The air density, which may be equivalently expressed in terms of the density altitude of the field;

(2) Actual gross weight of the aircraft;

(3) The magnitude of head or tailwinds; and (4) The available horsepower of the aircraft.

The value of the V2 indicated air speed which the aircraft must attain before it can be safely lifted from the runway, will depend solely on the gross weight of the airplane. This is because V2 is an indicated airspeed and therefore, air density, head or tailwinds, etc. will have no effect. It will be clear that given any specific gross weight for a given type of airplane, the critical speed at which it can be lifted from the runway will depend only on the relative indicated speed of the plane with respect to the air.

In accordance with CAA regulations, the maximum gross weight of an aircraft is limited in accordance with the nature of the particular runway to provide a V2 critical speed of such value that should an engine fail at or about the V1 critical speed, the aircraft can be accelerated on the runway with the remaining engines to safely take-off, climb out, and clear the end of the runway or any obstructions by at least 50 ft.

The present invention has as one of its primary objects, the provision of a calculating apparatus which may be used as a safety accessory device to indicate one or more of the critical speeds discussed above, whereby a pilot is instantly advised as to appropriate action to be taken in the event of an engine failure.

More particularly, an object of the invention is to provide a calculating device employing indicating markers adapted to be positioned about the periphery of an air speed indicator to designate the values of the critical V1 and V2 speeds, whereby the position of the air speed indicating needle with respect to these markers at the moment of engine failure will immediately advise the pilot of the appropriate action to take.

Another important object is to provide, in a device of the above nature, a calculator employing various scales pertaining to the performance characteristics of the aircraft in which the device is installed, whereby the V1 speed may be calculated by proper positioning of a manual control knob with respect to these scales, the computed answer being indicated on the air speed indicator by movement of the marker to a certain position in response to movement of the control knob.

Another object is to provide an accessory device which is compact and rugged, requires no complicated gearing or external source of power, may be easily operated, and takes into account all of the significant variable factors for determining proper V1 and V2 critical speeds.

A more general object of the invention is to provide a calculating device which will yield the value of a dependent variable from a multiplicity of independent variables.

A preferred form of the calculating device for realizing the above objects and advantages will now be described in detail with respect to the accompanying drawings, in which:

Fig. 1 is a schematic showing of an airport runway with certain points thereon at which critical speeds must be attained by an aircraft taking off;

Fig. 2 is a front view partly in section of the safety calculating device of the present invention shown in position over an air speed indicator in a multi-engine aircraft;

Fig. 3 is a cross-section taken in the direction of the arrows 3—3 of Fig. 2;

Fig. 4 is a schematic perspective view showing the gearing between the calculating scale control knobs and the markers;

Fig. 5 is a cross-section taken in the direction of the arrows 5—5 of Fig. 2; and Fig. 6 is an enlarged view of the V1 calculator scales shown in Fig. 1.

Referring to Fig. 1, there is schematically indicated an airport runway 10 divided into given lengths S1, S2 and S3. Above the runway there is shown an aircraft take-off path 11. It will be seen that as the aircraft starts from the left end of the runway and accelerates through the distance S1 during the take-off, there will be attained, at a certain point 12 on the runway, a critical speed V1 at or below which, should one engine of the aircraft fail, deceleration of the aircraft within the remaining length S2 plus S3 of the runway is possible. As discussed previously, this critical speed V1 will depend upon a number of factors. It will be clear from Fig. 1, however, that the value of speed V1 must have some corresponding intermediate position 12 on the runway whereby the remaining length of runway S2 plus S3 is sufficient for safe deceleration of the aircraft to a stop.

Also shown in Fig. 1 is a second position 13 on the runway corresponding to the speed V2, which the plane must attain on the runway with the remaining engines in order that it may be lifted from the runway and clear the end of the runway by at least 50 ft. It will be apparent that the V1 critical speed will be related to the V2 critical speed. This is because, if the aircraft's speed is at or above V1 at the point 12 and an engine fails, it will be capable of accelerating with the remaining engines within the distance S2 to the V2 critical speed at point 13, and then climb out at V2 speed within the distance S3 to clear the end of the runway by 50 ft.

It will be seen that the knowledge of the V2 speed is important if an aircraft engine fails at V1 or above, inasmuch as the pilot will know that he must hold the plane on the runway until it accelerates to speed V2 before he can safely lift the aircraft and clear the end of the runway by 50 ft.

Another way of looking at the situation with regard to Fig. 1 is as follows. The field length S1 plus S2 plus S3 is the minimum runway length measured from the start of roll, within which the aircraft can attain a height of 50 ft. directly above the runway, as well as be brought to a stop after failure of an engine on the ground. The critical V1 speed is then defined as that speed for which the distance required to accelerate the aircraft on the ground with one engine inoperative, from the point of engine failure 12 to the climbing speed V2, point 13, and climb to a 50 ft. height with engine failure.

If an engine fails prior to reaching the critical V1 speed, the aircraft should be brought to a stop, since the total distance required to stop will then be less than the critical take-off distance S2 plus S3. The pilot should not attempt to continue the take-off in this case, inasmuch as the total distance required to clear a 50 ft. height would then exceed the critical take-off distance. However, if an engine fails after reaching the critical V1 speed, the take-off should be continued.

It is thus clear that both V1 and V2 speeds must be known to enable the pilot to take immediate and correct action in the event of an unexpected engine failure at any point during a take-off.

In Fig. 2 there is shown a preferred embodiment of the computer-marker device of the present invention for computing and indicating V1 and V2 speeds, as it would appear on the instrument panel of a multi-engine aircraft. As shown, the device comprises a suitably shaped housing or casing frame 14 having a central circular opening or window 15 through which is exposed the usual air speed indicator 16 on the aircraft instrument panel. The casing 14 is accordingly adapted to simply fit over the air speed indicator, the latter instrument showing through the opening or window 15. Suitable openings at the lower end of the casing 14 as indicated at 17 and 18, and at the center top portion of the casing as indicated at 19 are provided for bolting or otherwise securing the device in position to the aircraft instrument panel.

Projecting radially inwardly from the inner periphery of the circular window 15 are two markers 20 and 21 designated V1 and V2 respectively. These markers are adapted to move about the inner periphery of the window 15 to be positioned juxtaposed various indicia on the air speed indicator. Movement of the V1 and V2 markers is accomplished by manually controllable knobs 22 and 23, also designated V1 and V2. As shown clearly in Figs. 2, 3, and 4, the control knob 22, designated V1, is provided with a spur gear 24 within the casing 14 adapted to mesh with suitable teeth on a ring gear 25, coaxial with the circular window opening 15. Similarly, the knob 23, designated V2 is provided with a spur gear 26 adapted to mesh with a ring gear 27 coaxially positioned in front of the ring gear 25. The markers 20 and 21 may be integrally formed with or rigidly secured to the ring gears 25 and 27 respectively.

The ring gears 25 and 27 are suitably supported within the casing 14 at their outside peripheral edges as shown in Fig. 5. These gears are separated by an annular spacing washer 28 and retained within the casing by a snap ring 29, whereby the rings 25 and 27 may rotate with respect to and independently of each other in accordance with rotation of the knobs 22 and 23. In other words, the positioning of the markers 20 and 21 with respect to the periphery of the air speed indicator dial 16 may be effected independently of each other.

With the above noted arrangement, it will be seen that rotation of V1 and knob 22 in a counter-clockwise direction results in the V1 marker 20 being moved clockwise about the periphery of the air speed indicator by ring gear 25 to designate an increased critical V1 air speed. Similarly, movement of the V2 knob 23 in a counter-clockwise direction will result in a clockwise movement of the ring gear 27 to move the V2 marker 21 in a clockwise direction about the periphery of the air speed indicating dial 16. It is thus seen that suitable positioning of the manual control knobs 22 and 23 results in corresponding positioning of the markers 20 and 21 with respect to the air speed indicator.

Referring specifically to Fig. 3, it will be seen that the casing 14 is provided with annular bosses 30 on its front face through which the shafts for the control knobs 22 and 23 extend. About the boss 30 for control knob 22 there is mounted a stationary scale in the form of a disc member 31. Behind the member 31, there is mounted a movable scale member 32, whereby the scale 32 may be rotated about the boss 30 with respect to the stationary scale 31. Movable scale 32 is provided with an extending lever or handle 33 for permitting easy manual rotation of this scale.

As seen in Fig. 2, the disc shaped stationary scale 31 is characterized by a peripheral edge 34 of given shape, eclipsing part of the movable scale 32. The shape of the periphery of this stationary scale is important inasmuch as the degree of eclipsing of the scale 32 by the edge 34 will depend upon the relative rotational position of the movable scale 32 with respect to the stationary scale. This operation will become clearer as the description proceeds.

The V2 control knob 23 is provided with a pointer 35 adapted to cooperate with a stationary scale 36 as shown clearly in Figs. 2 and 3. Inasmuch as the critical V2 speed depends only on the gross weight of the aircraft, there is but a single scale necessary for the proper setting of the V2 marker 21.

It will be recalled that the value of the critical air speed V1 depends on four variable factors:

(1) The air density (equivalently expressible in terms of density altitude);
(2) Actual gross weight;
(3) Head or tailwinds;
(4) Available horsepower.

With regard to air density: at a given airport at the time of take-off an altimeter, when set to standard sea level pressure of 29.92 in. on the scales provided, will indicate the pressure altitude. To this pressure altitude, temperature corrections are applied through the use of appropriate data to determine the density altitude of the airport. Since it is the actual air density rather than the physical elevation above sea level of the field which is important, the V1 critical speed depends upon this air density expressed in an equivalent density altitude. Clearly, the less density there is, the more runway length will be required before the critical V1 speed can be attained. Effectively, low density air results in an increase in the critical V1 speed.

As to the actual gross weight of the plane, a greater gross weight, of course, will require a greater V1 speed. Thus, the particular V1 critical speed will depend on both the density altitude and the actual gross weight of the aircraft.

The third factor of head or tailwinds is also important. It is to be noted, for example, that if there is a small headwind, the air speed instrument in the aircraft will be registering a certain aircraft speed while the plane is stationary, and therefore this indicated speed must be taken into account, with certain arbitrary allowances dictated by CAA in computing the V1 critical speed in order to indicate to the pilot the correct value of V1. In the event there is a tailwind, the effective V1 speed is decreased.

Finally, the available horsepower at the time of takeoff will determine the acceleration of which the plane is capable, and since this acceleration determines how much length of runway is covered before the critical V1 speed can be attained, it also must be taken into account in determining V1. Any decrease in available horsepower from a standard value will act to increase the required V1 speed.

The above described four interdependent variables are taken into account in determining the V1 speed by means of the various scales associated with the V1 control knob 22.

Referring to the enlarged view of the scales for computing the value of V1 shown in Fig. 6, it will be seen that the control knob member 22 is provided with a transparent extension 37 terminating in a pointer 38 and having an indexing line 39 extending throughout its length. The indexing line 39 constitutes an altitude scale numbered in thousands of feet, as 2, 4, 6 and 8.

The stationary scale comprising the element 31 is provided with a series of gross weight curves in thousands of pounds extending generally in curved radial directions as shown at 40. Note in the specific embodiment of the computer disclosed in Fig. 6, that the peripheral edge 34 of the stationary scale 31 is in the form of a curve of varying radius of curvature, progressive peripheral points in a counter-clockwise direction being respectively further spaced from the center of the scale.

The movable scale 32 is provided with appropriate head and tailwind curves 41 extending for example from −10 to +50 M. P. H. and also with horsepower curves 42, these latter curves being transverse to certain of the headwind curves. The horsepower curves may extend for example over a range from 7600 H. P. to 9600 H. P., each individual segregated curve designating the same value at any point on the curve. If desired, these curves may be expressed as losses in horsepower from any given standard horsepower value, rather than as available horsepower.

The actual positioning of the curves on the various scales is determined from aircraft performance charts and, of course, depends upon the particular kind of air speed indicator dial indicia employed and the relative diameters of the driving gears 24 and 25. Clearly, once the specific type of air speed indicator dial has been chosen and suitable gears employed to drive the markers about the periphery of the air speed dial, the various curves on the scales can be so adjusted as to effect the proper relationship between the positioning of the V1 knob 22 with respect to the scales and the corresponding positioning of the marker 20 with respect to the air speed indicator dial. The device is thus adaptable to all types of air speed indicators, only changes in the scales being necessary.

To illustrate how the V1 and V2 speeds are indicated by the markers 20 and 21 respectively, a specific example of the operation of the device under assumed conditions will now be given.

Assume that a multi-engine aircraft is at the initial end of the runway shown in Fig. 1 and is preparing for take-off. The gross weight of the aircraft is always known by the pilot at this time. The determination of the V2 critical speed may be immediately evaluated by simply rotating the V2 knob 23 so that its pointer 35 will be positioned at the gross weight value on the scale 36. Assuming that this gross weight is 80,000 lbs., the V2 knob 23 will be positioned as shown in Fig. 2 opposite the 80,000 lb. mark. Rotation of the knob V2 to this position results in a positioning of the V2 marker 21 with respect to the periphery of the air speed indicator through the action of the gears 26 and 27. As shown in Fig. 2 the V2 marker 21 is positioned at 110 M. P. H. indicating to the pilot that when the air speed indicator needle points to 110 M. P. H., it is safe for him to lift the airplane off the runway. In other words, for a gross weight of 80,000 lbs. an air speed of 110 M. P. H. must be attained before attempting to lift the aircraft off the runway.

To determine the proper setting for the V1 marker 20 the following procedure is followed: first, the density altitude is determined as previously explained. Say this density altimeter indicates an effective altitude of 6,000 ft. The pilot will then rotate the knob member V1 until the 6,000 ft. index mark on the transparent extension scale indexing line 39 intersects the 80,000 lbs. gross weight curve on the stationary scale 31. This point is indicated at X in Fig. 6. It will be seen that if the gross weight were 90,000 lbs. the V1 knob member 22 would have to be further rotated in a counter-clockwise direction to the point where the 6,000 ft. altitude index intersected the 90,000 lbs. gross weight line.

As will be clear from the arrangement of the gears 24 and 25, rotation of the knob V1 in a counter-clockwise direction causes the ring gear 25 to rotate in a clockwise direction to move the V1 marker 20 about the periphery of the air speed indicator to designate a V1 critical speed of increased value. This increased value is logical since a greater gross weight means that the critical V1 air speed to be attained must be greater in order that the aircraft can accelerate to V2 with the remaining engines in the event of an engine failure. Moreover, it will be seen that with less density, or an effectively greater altitude, the knob V1 would be rotated slightly further in a counter-clockwise direction to properly make the new higher altitude mark on index line 39 intersect the gross weight curve, thus further increasing the V1 critical speed. Again it will be clear that this V1 speed is properly greater if the field elevation is high or the air less dense.

After the V1 control knob 22 has been set at the position X as shown in Figs. 2 and 6, the movable scale 32 is actuated by the lever 33 to position its zero point opposite the tip point 38 of indexing line 39 of the V1 knob. This position of the movable scale 32 is shown in Figs. 2 and 6.

The next factor to take into account is a head or tail-wind. Assume for the sake of the present example, that there is a 50 M. P. H. headwind. The V1 control knob 22 is then rotated off the position X until its indexing line 39 intersects the point where the 50 M. P. H. headwind curve meets the spiral shaped peripheral edge 34 of the stationary scale 13. It is to be noted that the points of intersection of the headwind curves and the periphery 34, depend upon the relative position of the movable scale 32 with respect to the stationary scale 31. It will be recalled that the positioning of the movable scale 32 was such as to bring its zero point opposite the tip 38 of the knob as previously set in accordance with altitude and gross weight. In other words, the point of intersection of the wind curves with the peripheral edge 34 depends upon the gross weight and altitude, these two latter factors determining the positioning of the tip 38 on the knob 22.

With a headwind of plus 50 M. P. H., the indexing line 39 on knob 22 will accordingly be moved in a further counterclockwise direction to the point Y. Movement of the knob 22 in this direction again increases the indicated V1 speed inasmuch as the marker 20 will be moved in a clockwise direction about the air speed indicator. As pointed out above, this increased value of V1 logically results inasmuch as when the plane is stationary, the air speed indicator needle will be registering 50 M. P. H. Therefore, a designated fraction of this initial indicated speed of 50 M. P. H. is added to the previously computed V1 speed. This addition is accomplished by the above noted further rotation of the knob V1 to the Y position.

It is to be noted that with a strong headwind, the position of the V1 control kob 22 is moved from the point X to a different position. In other words, an increased gross weight is indicated on scale 31 at the point where the indexing mark 6 on line 39 crosses the new gross weight curve. This simply means that a greater gross weight may be accommodated for the particular length runway, than would be the case were there no headwind. Thus in the example of a 50 M. P. H. headwind, the new gross weight curve will intersect the altitude line 6000 ft. at the point W indicating an available gross weight value of 84,000 lbs. or 4000 lbs. more than the actual gross weight of the aircraft. Thus with a headwind of 50 M. P. H. an additional 4000 lbs. gross weight may be taken aboard if desired, other factors permitting.

The final factor to be taken into account in computing the V1 critical speed is the available engine horsepower. As described previously, the horsepower curves are represented by the lines 42 on the movable scale 32. When describing the proper positioning of the knob to take into account the available horsepower, assume first that the knob is in the position shown in Figs. 2 and 6 and that there is no head or tailwind. In this event, the movable scale 32 will be positioned with its zero point adjacent the tip 38 of the control knob as shown. Then to take into account the available horsepower, the control knob is rotated to the appropriate horsepower curve at the point where it intersects the peripheral edge 34 of the stationary scale.

If we assume that the standard horsepower in the present example is 9600 which curve coincides with the zero wind mark on the movable scale, and that this power drops to an available horsepower of 9200, as would occur for example, should one of the water injection systems fail, the knob V1 can be readjusted at the last minute to take this into account. For example, assuming that there is a loss of 400 H. P. in one of the engines, the knob V1 will be rotated in a counter-clockwise direction to the point, shown at Z, where the 9200 H. P. curve intersects the peripheral edge 34 of the stationary scale. Again it is to be noted that the position of the knob V1 with respect to the horsepower curve depends upon the amount these curves are eclipsed by the peripheral edge 34 of the stationary scale 31. The degree of eclipsing in turn depends upon the setting of the movable scale 32, that is, upon its position after zeroing it with respect to the tip 38 of the control knob V1.

It is to be noted that with decreased power, the V1 critical speed is effectively increased. This means that the marker V1 will approach the marker V2, or that the difference between the V1 critical speed and the V2 critical speeds will decrease. The reason that an increased V1 speed is indicated, results from the fact that there is not as much power available for accelerating the plane between the point on the runway where the engine fails and the point on the runway where the V2 speed must be attained. Since there is not as much acceleration, the distance between these two points must be decreased, and thus a greater V1 critical speed must be indicated.

In the event that there is a headwind of 50 M. P. H. and also a change in engine horsepower, the knob V1 is first set to the point Y to position the V1 marker 20 to take into account the headwind. After this setting is made, the movable scale 32 is then moved in a counter-clockwise direction to zero it on the tip 38 of the new V1 knob setting, and then a further V1 knob setting is made in accordance with the available power as described above.

It is thus seen that the stationary scale 31 with its non-circular peripheral curve 34 cooperating with the movable scale 32 and the altitude scale indexing line 39 enables the computation of a proper V1 speed to be readily accomplished from four inter-related factors. The various values of gross weight, altitude, head or tailwind, and available horsepower are all known to the pilot immediately prior to the take-off and he can set up the proper V1 speed relatively quickly by suitable manipulation of the knob 22 and lever arm 33. The V2 critical speed is easily indicated by one simple motion as previously described.

Heretofore it was necessary for the pilot to consult different charts and perform various mathematical computations to determine V1 and V2. With these two speeds properly indicated on the air speed dial in accordance with the device of the present invention, the pilot can tell at a glance during his take-off operation whether, at the time an engine fails, his air speed is sufficient to enable him to continue the take-off or whether he should cut power and apply the brakes. In other words, he will know that if the air speed as indicated, is below the position of the V1 marker 20 such braking action can be made safely. Conversely if the air speed as indicated is above the V1 marker 20, any braking action will be insufficient to stop the plane safely on the runway length remaining, but the aircraft can safely accelerate to V2 and clear the end of the runway by fifty feet. The present invention thus eliminates all guess work on the part of the pilot and is an enormous safety factor in determining the appropriate action to be taken in such an emergency.

While the calculator of this invention has been described in connection with V1 and V2 speeds during the take-off operation of an aircraft, it is to be understood that the principles of yielding a quantity whose value depends on a plurality of inter-related variables by means of the arrangement of scales as described, has many other applications, and the invention is therefore not to be thought of as limited to the specific embodiment disclosed.

We claim:

1. In a calculator, the combination comprising: a movable member having an indexing line; a stationary scale disposed in cooperative relationship with respect to said movable member, said stationary scale having a peripheral edge of given shape; and a movable scale mounted adjacent said stationary scale for movement independently of said movable member, said movable scale being arranged to extend partially under the peripheral edge of the stationary scale, whereby said indexing line on said movable member is cooperable with both said stationary and movable scales simultaneously, and movement of said movable scale results in the eclipsing of portions thereof by said peripheral edge of the stationary scale.

2. A calculator according to claim 1, including an indicating marker mechanically coupled to said movable member and a set of indicia cooperating with said marker whereby the positioning of said marker with respect to said indicia will depend on the positioning of said movable member with respect to said stationary and movable scales.

3. A calculator according to claim 1, in which said movable member, stationary scale and movable scales are coaxially disposed with respect to a given axis, said movable scale having portions spaced radial distances beyond the peripheral edge of said stationary scale, and said peripheral edge varying in radial distance from said given axis whereby movement of said movable scale results in varying portions thereof being eclipsed by said peripheral edge.

4. A calculator according to claim 3, including an indicating marker mechanically coupled to said movable member and a set of indicia cooperating with said marker whereby the positioning of said marker with respect to said indicia will depend on the positioning of said movable member with respect to said stationary and movable scales.

5. In a multi-engine aircraft including an air speed indicating instrument having a dial with air speed indicia thereon, a calculator adapted to cooperate with said instrument to indicate necessary air speed values for a safe take-off operation in the event one of the engines of said aircraft fails, said calculator comprising in combination: a first marker adapted to be disposed adjacent said dial; first means mechanically coupled to said first marker for positioning said first marker with respect to the dial to indicate a first air speed on the dial; a second marker adapted to be disposed adjacent said dial; and second means mechanically coupled to said second marker for positioning said second marker with respect to the dial to indicate a second air speed on the dial.

6. A calculator according to claim 5, in which said first and second means each includes a manually rotatable knob member and a scale means associated with the member, each member having an indexing point for positioning with respect to indicia on its associated scale means.

7. In a multi-engine aircraft including an air speed indicating instrument having a dial with air speed indicia thereon, a calculator adapted to cooperate with said instrument to indicate air speed values necessary for a safe take-off operation from a given runway in the event one of the engines of said aircraft fails, said calculator comprising in combination: a marker adapted to be disposed adjacent said dial; a rotatable knob member mechanically coupled to said marker for moving said marker to indicate various air speeds on the dial; stationary and movable scales adjacent said rotatable member; said scales having curves defining factors affecting operation of said aircraft; and an indexing line on said member adapted to overlie both said stationary and movable scales simultaneously whereby said marker can be positioned by positioning said indexing line with respect to data on said indexing line and scales to indicate an air speed below which said aircraft may safely be decelerated to full stop within the confines of said runway in the event one engine fails.

8. A calculator according to claim 7, including an additional marker adjacent said dial; an additional rotatable member mechanically coupled to said additional marker; and a scale associated with said additional rotatable member having indicia defining various gross weights for said aircraft, whereby said additional marker can be positioned by positioning said additional rotatable member with respect to said gross weight indicia, to indicate an air speed above which said aircraft can safely climb to a height of at least 50 ft. above the end of said runway.

9. In a calculator, the combination comprising: first, second and third scale members mounted for relative coaxial pivotal movement to one another, said first scale member having an index line extending outward from the pivot axis and bearing scale lines intersecting said index line, said second scale member bearing spaced scale lines intersecting said index line at spaced points therealong, said second scale having a curved line of varying radius extending about said axis, and said third scale bearing a zero point mark for registration with said index line on said first scale member and bearing also spaced curves variably eclipsed by said curved line on said second scale member.

References Cited in the file of this patent

UNITED STATES PATENTS 2,095,215    Hess  ---------------- Oct. 5, 1937